US 6,651,074 B1

(12) United States Patent
Taylor

(10) Patent No.: US 6,651,074 B1
(45) Date of Patent: Nov. 18, 2003

(54) METHOD AND APPARATUS FOR STORAGE AND RETRIEVAL OF VERY LARGE DATABASES USING A DIRECT PIPE

(75) Inventor: Kenneth J. Taylor, Franklin, MA (US)

(73) Assignee: EMC Corporation, Hopkinton, MA (US)

(*) Notice: Subject to any disclaimer, the term of this patent is extended or adjusted under 35 U.S.C. 154(b) by 0 days.

(21) Appl. No.: 09/467,355

(22) Filed: Dec. 20, 1999

(51) Int. Cl.[7] .......................... G06F 12/00; G06F 17/30

(52) U.S. Cl. .................. 707/204; 707/205; 707/202; 707/1

(58) Field of Search ..................... 707/204, 205, 707/202, 1

(56) References Cited

U.S. PATENT DOCUMENTS

| | | | | |
|---|---|---|---|---|
| 5,384,890 A | * | 1/1995 | Anderson et al. | 395/2 |
| 5,778,392 A | * | 7/1998 | Stockman et al. | 707/205 |
| 5,968,134 A | * | 10/1999 | Putzolu et al. | 709/302 |

OTHER PUBLICATIONS

*EMC Data Manager Product Description Guide*, 1999, Chapter 4, EDM Symmetrix Connect and EDM Symmetrix Path, pp. 23–31.

* cited by examiner

*Primary Examiner*—Safet Metjahic
*Assistant Examiner*—Cindy Nguyen
(74) *Attorney, Agent, or Firm*—Brian L. Michaelis; Brown Rudnick Berlack Israels LLP

(57) ABSTRACT

A method and apparatus for directly connecting very large data streams from an archive command into a backup data system using an "intelligent process." An output stream is piped into an intelligent pipe-reading process and distributed over a set of temporary data stores built from raw storage resources. A pipe interface process supervises backup of each filled data store, while the remaining output stream continues to be piped into another available data store. The backup system completes archiving of the datastream, keeping a catalog of the datastream storage locations. To retrieve the data, the intelligent process is run in reverse as a pipe-writing process, requesting data from the backup system. Retrieved data traverses the data stores from the backup system and are pumped into the pipe-writing process for delivery to the pipe output file identified by the retrieve or import command.

17 Claims, 4 Drawing Sheets

METHOD AND APPARATUS FOR STORAGE AND RETRIEVAL OF VERY LARGE DATABASES USING A DIRECT PIPE

FIELD OF THE INVENTION

This invention relates generally to storage and retrieval of large databases, and more particularly to the use of temporary storage for moving large files.

BACKGROUND OF THE INVENTION

As large computing enterprises continue their migration from centralized mainframes and volumes of data on direct access storage devices (DASD) and serial tape drives, the reliance upon open systems database technology has increased. The ability to quickly adapt mass storage systems to new platforms, while retaining high performance and reliability will remain key elements for system integrators.

In earlier times, rooms full of DASD and tape drives were maintained by legions of storage operators who physically mounted and unmounted tapes and disk packs and moved them to and from libraries according to daily schedules and batch job instructions. Technology improvements allowed the use of self-contained "mass storage" units, using robotic arms to move archived storage media to and from the drive mechanisms in a matter of seconds. Further developments of storage media have enabled a cache model in which large masses of data are held in offline resources and smaller portions can be uploaded to the high-speed cache as necessary. Data availability has also been increased through the use of arrays of mirrored databases, either single or multi-threaded, for multiple simultaneous access capabilities.

Even with mirrored systems, operational concerns often require that the magnetic or other storage media be archived or "backed up." There are also occasional system reorganizations or restructuring during which a database may be converted by copying it out in one format ("export") and copying it back in ("import") with a different format, or into a different structure. Back-up issues will also arise when converting from one database management system (DBMS) to another, or sharing databases. Application programs themselves may also request the operating system to make a large "save" of data files, usually after a modification is made to the file. Backing up of large volumes of data can be a time consuming and resource intensive operation. Mass storage systems, disadvantageously may be unavailable while large back-up operations are performed.

FIG. 1 illustrates a typical system in which a host computer 10 is connected to a backup system 12 and a storage system 14. Creating a physical backup of the entire database 24 of the storage system 14 often requires a large investment of time and resources. In an open, networked array of storage devices, a physical backup of a database may be handled by arranging for a DBMS 22, such as provided by Oracle Corporation, to communicate with a dedicated back-up system 12, such as the EMC Data Manager, from EMC Corporation of Hopkinton, Mass. The DBMS system vendor often supplies an Application Programming Interface (API) 20 that can be installed in the host computer to handle the scheduling of the regular backups. The DBMS system typically reads the data from the database via the local DASD interface (such as SCSI bus), and delivers a buffer of data through the API. The application running the backup may be customized or optimized for the particular mass storage system selected, such as the EMC Data Manager (EDM) which is optimized to run with EMC's Symmetrix storage system(s). The EMC backup application, or something similar, take the necessary steps to send the data over the network using a connection-oriented protocol such as Transmission Control Protocol (TCP). The receiving backup system then sends the data to a mass storage unit 18, such as to write the data to an archive tape 18A. The major drawbacks of physical backup include that logical structures, such as tables of data cannot be backed up. Further, data cannot be transferred between machines of differing operating systems. Additionally, data blocks cannot be reorganized into a more efficient layout.

Many of the major DBMS companies also provide a more generalized facility in which the data is exported as a standardized file, such as in ASCII format, as part of a so-called "logical backup." The ASCII format permits the file to be imported into most other systems, without insurmountable compatibility problems. However, presently DMBS companies generally do not provide the API necessary for a customer to properly handle the data stream generated by the logical backup. The result is that many of the DBMSs generate very large backup files that have to be stored locally until they can be written to an archive device.

To overcome this disadvantage, some customers create their own primitive solution by attaching a physical tape drive to the machine. The logical backup data stream is then directed into a process that Unix calls a "pipe," buffered, and then directed ("piped") by another Unix command such as one that writes the data to the local tape drive 16, a DASD, or other demountable, writable media. A Unix pipe can be thought of as a FIFO (first-in first-out) data file having one process writing data into it serially and another process serially reading data out. When the pipe is "empty," the reading process simply waits for more data to be written by the other process. Other non-Unix operating systems such as DOS and Windows NT emulate the Unix pipe in various ways with similar results. Logical data streams are thus directed from a database export into another process that disposes of the data to the physical storage media, thus freeing up storage resources.

This primitive solution has several disadvantages. For one thing, it requires a physical tape drive 16 to be attached to the computer host 10 generating the backup. Alternatively, the logical backup could be piped to a command that writes the data onto disk or equivalent. However, this solution would require each such machine to have huge amounts of excess storage capacity. In either case, additional operations personnel must be assigned to handling the tapes and disks, and maintaining the drives. Extra storage devices, media libraries, and personnel also take up extra space in the facility. Another alternative would be to pipe the logical backup data stream into the network interface and send it to a different machine having a DASD or tape. When dealing with very large databases, these solutions could break down entirely, due to the operational difficulties of maintaining the necessary physical media, or open network connections.

The named pipe provides a standard mechanism that can be used by processes that do not have to share a common process origin for process-to-process-to-device transfers of large amounts of data. The data sent to the named pipe can be read by any authorized process that knows the name of the named pipe. In particular, named pipes are used in conjunction with the Oracle DBMS import/export utility to perform the logical backup/restores necessary to restructure or reorganize very large data bases (VLDBs). Typically, the user creates a named pipe and runs an export utility specifying the named pipe as the output device. The DBMS sees the pipe as a regular file. Another process, including for example Oracle DBMS commands such as dd (convert and copy a file), cpio (copy files in and out), rsh (execute command on a remote system), etc., then reads from the other end of the pipe and writes the data to actual media or the network. This technique is used to write export data to local disk/tape or over the network to available disk/tape on another machine.

As mentioned, a disadvantage of the existing methods is the large amount of time it takes to perform backups, during which the database may be partially or completely offline due to read/write interlocks. Some of this delay can be reduced by segmenting export/backup files, and running several processes in parallel. Even though the logical backup process can be segmented into parallel streams by some DBMSs, the implementations may be proprietary and not necessarily adaptable for import to another DBMS. Also, disadvantageously, a dedicated disk or dedicated tape is required. Further, in known implementations, there is an inability to catalog multiple versions.

VLDB reorganization and restructuring are major operations for which there is no known highly efficient solution. Current solutions do not use the data management services of an Enterprise Data Management Tool (such as EDM). A VLDB administrator has the ability to divide large tables into separate physical partitions. The partitions can be backed up, stored, exported and imported separately from the rest of the table. Customers consider this a critical feature that should be heavily used. Existing backup systems and APIs do not have the ability to export or import partitions in parallel using all available tape drives. Any API solution would be necessarily proprietary to the DBMS vendor, and not generalizable to other systems.

SUMMARY OF THE INVENTION

The present invention, provides a method and apparatus for directly connecting very large data streams from an archive command into a backup data system using an "intelligent process."

According to the invention, a pipe interface process supervises backup of each filled data store, while the remaining output stream continues to be piped into another available data store. The backup system completes archiving of the datastream, keeping a catalog of the datastream storage locations. To retrieve the data, the intelligent process is run in reverse as a pipe-writing process, requesting data from the backup system. Retrieved data traverses the data stores from the backup system and are pumped into the pipe-writing process for delivery to the pipe output file identified by the retrieve or import command.

An intelligent pipe process according to the present invention is a configurable client process that runs on each system that requires the enhanced backup or export services. The intelligent pipe is configured to manage the distribution of the piped data stream to and from pre-selected data stores, and to trigger the backup system for further data handling on output. The receiving process in the backup system is also configured to wait for storage requests from the intelligent pipe, schedule the storage, update the catalog, and report completion status back to the intelligent pipe.

In an alternative embodiment of the invention, many of the data-store management tasks and backup scheduling can be handled by a self-contained backup system adapted for the purpose, leaving less activity for the intelligent pipe process, thus freeing up additional resources in the host computer.

Features of the invention include a method and apparatus wherein temporary storage, communication, and archiving for output of a generic database export command pipe is managed in a manner transparent to the customer operating the host computer. The customer is relieved of the need to maintain additional large local storage devices for physical or logical backups. The customer does not have to construct and maintain specialized pipes or scripts for network backups, or for different physical tape devices or DASDs.

Implementing a pipe process rather than a specific export/import function reduces the number of proprietary restrictions and configuration difficulties that depend upon choice of database implementation. The backup and archive methodology remains independent of the database structure or selected DBMS. Similarly, there is no need to work with a different API from each DBMS vendor, nor any customization of the Unix operating system.

A plurality parallel pipes according to the invention can be implemented for faster transfers of segmented database backups, where that feature is implemented in the DBMS. Furthermore, the invention enables any output-generating Unix-like process (application save, non-Oracle backup/restore) to have its results sent to the existing backup system, thus freeing up local resources automatically. Similarly, the same invention can be operated in reverse, enabling any Unix-like input-receiving process to obtain its data directly from a mass storage backup system. The temporary disk space needed to implement the data stores can also be designed as part of a backup system rather than the host computer, freeing up computer resources.

BRIEF DESCRIPTION OF THE DRAWINGS

The foregoing and other features and advantages of the present invention will be more fully understood from the following detailed description of an illustrative embodiment, taken in conjunction with the accompanying drawing in which.

DETAILED DESCRIPTION

Figure 1:
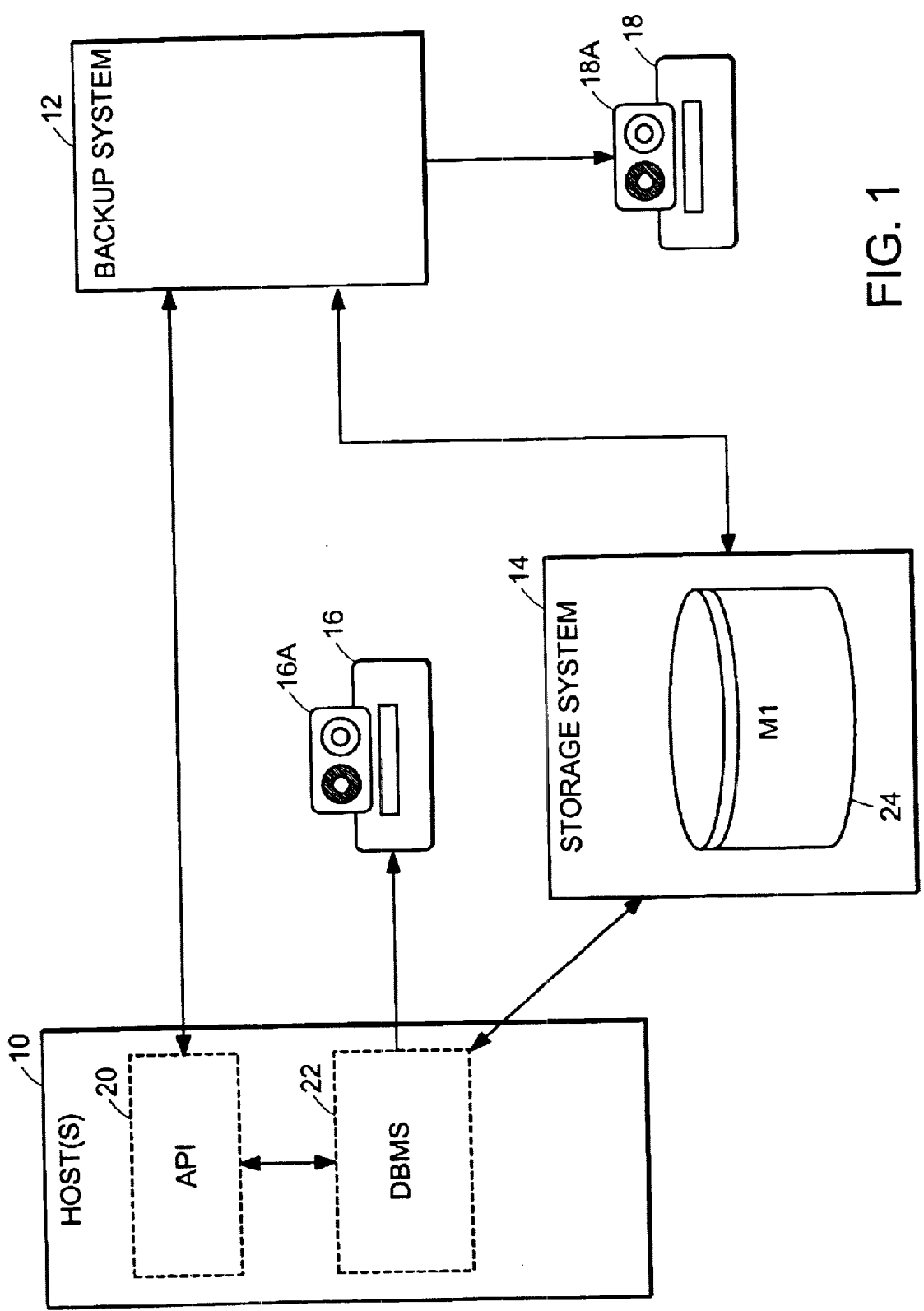
FIG. 1 is a block diagram for a conventional back-up system according to the prior art.
Figure 2:
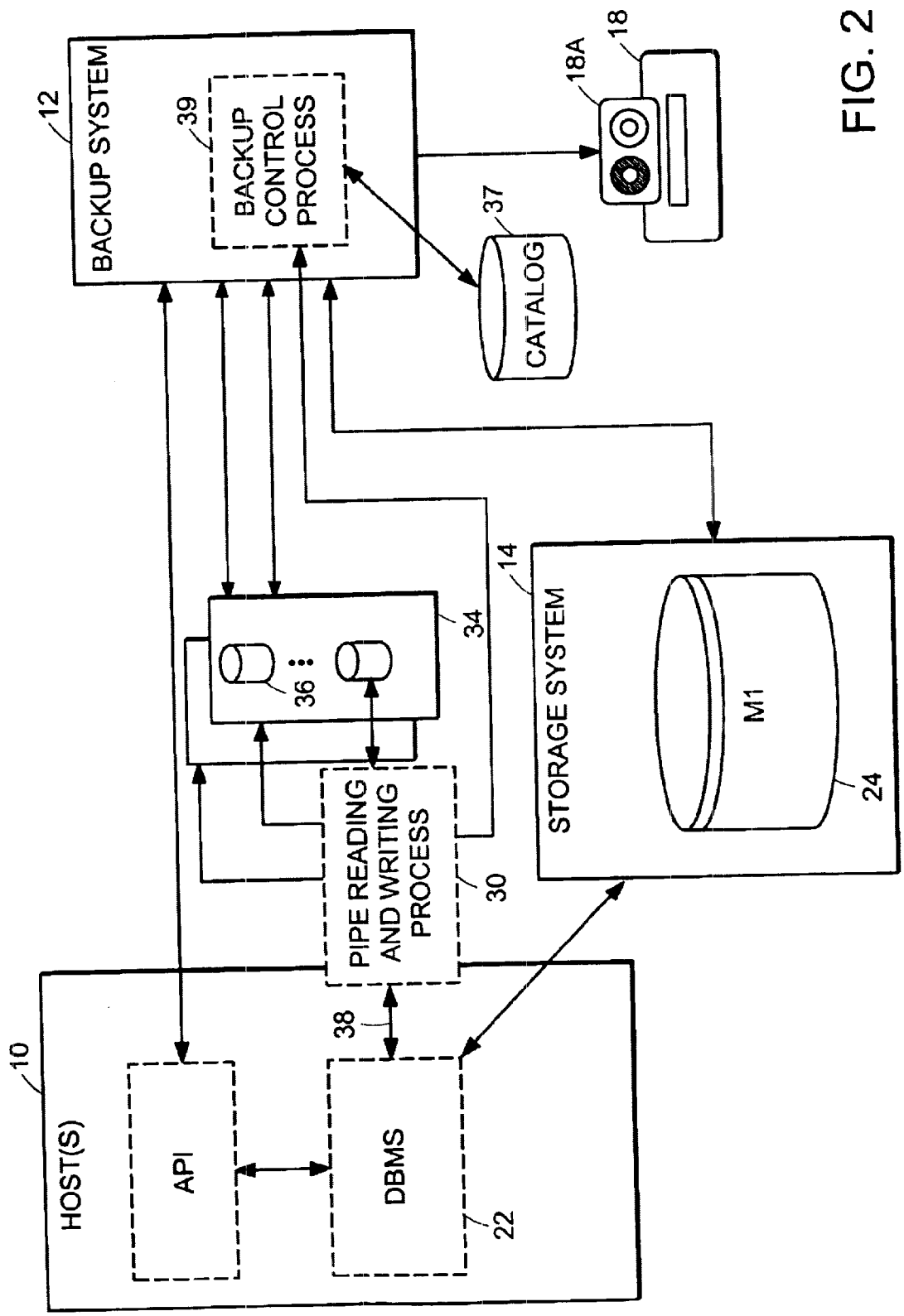
FIG. 2 is a block diagram illustrating a system having enhanced facilities according to the invention.

The present invention provides a method and apparatus for directly connecting very large data streams from a DBMS into a backup system. As illustrated in FIG. 2, an output data stream 38 from a database export command of a DBMS 22 is piped into an intelligent pipe-reading process 30 and distributed over a set of temporary data stores 34 built from raw storage resources 36. When a data store reaches capacity, the intelligent process 30 signals the backup system 12 to begin a backup of that data store, while the remaining export data stream is piped into another available temporary data store 34. Once the final data store has received an end-of-pipe signal, the backup system begins completion processing of the export request (e.g., writing to tape device 18). The backup system keeps a logical backup catalog, and writes it to the backup tape with the archived datastream. Once the archive tape activity is complete, the backup system signals back via the backup control process 39 to the intelligent process 30. The data store is marked available by the intelligent process. This continues until the dbms 22 closes the pipe 38. At this point the intelligent pipe process 30 will notify the backup control process 39 that the final data should be backed up. It will then wait until notified by the backup control process 39 that all data stores 34, 36 are available (i.e., the backups for all stores are complete). The intelligent pipe process 30 signals the backup control process 39 that there is no more data to back up. The backup control process 39 commits all catalog data 37 tying the individual data store backups together as a single logical backup.

To activate the intelligent process according to an embodiment of the invention, a named pipe is created using the Unix command mknod. The next command issued is eb_dc_pipe if=named_pipe. This command executes a process that will wait until data is written to the pipe. The eb_dc_pipe is an intelligent pipe reading command. Then a database command is issued, such as the Oracle command exp file=named_pipe, with specified options. These commands can be encapsulated within a single command. In the event that the backup is initiated from the EDM graphical user interface (GUI), these commands will be encapsulated into a single command which will be placed onto the host and executed at backup time. This command starts the DBMS writing the data to the pipe and could also be any application program, including non-Oracle logical backups. For example, the Oracle export command causes the DBMS to write an ASCII-encoded file, using normal Unix primitives. In this case, the DBMS output is sent to the named pipe which is read by an intelligent process, although it is read and written as a normal file.

During configuration of the eb_dc_pipe software, a set of data stores on the host computer is identified and listed. The list is also provided to the backup system for linkage between the client and the backup system. Appropriate steps must be taken to translate the storage references to conform to the view of the disk space from the backup system that may be different from the client's view of the same disk space.

A sufficient size and number of data stores are preferably defined so that export processing is never waiting for a data store to become available. Factors known to influence these calculations include the transmission delay, average queuing delays for each component in the process, storage access time in the data stores and mass storage, logical and physical arrangement of the data storage, etc. One embodiment of the data stores could be implemented on a mirrored disk, although a non-mirrored approach is likely to have less overhead and device conflict.

Figure 3:
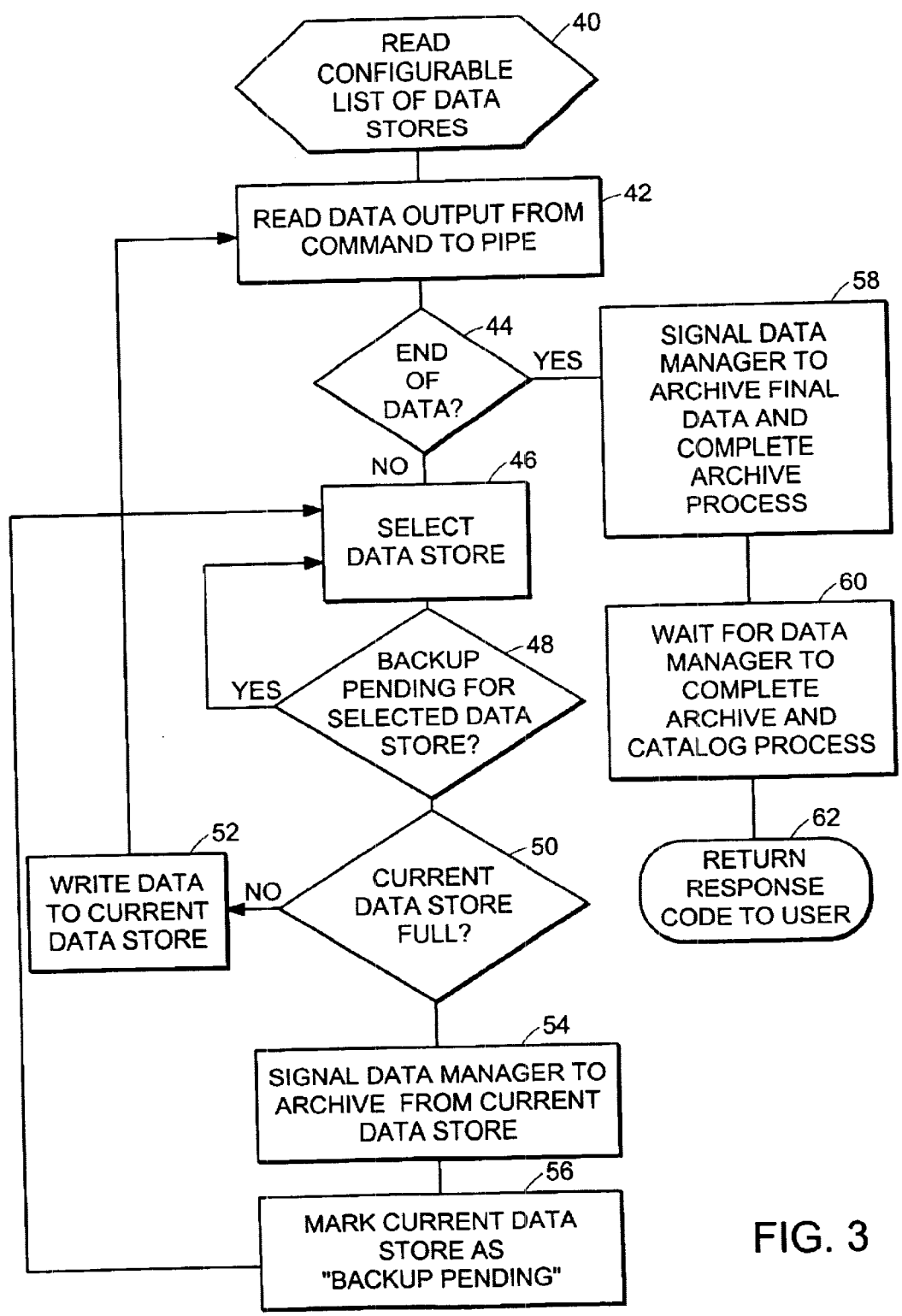
FIG. 3 is a flowchart showing additional details in the operation of a direct connect intelligent process according to the present invention.

A typical archive operation in accord with an embodiment of the present invention is illustrated in FIG. 3. The intelligent process is typically activated when the pipe is created in anticipation of a database backup stream. When the archive operation is activated, the illustrated intelligent process reads the list of data stores 40 that have been allocated for this operation. Data is then read 42 from the output stream generated by the command feeding the pipe (e.g., the DBMS export file command). The intelligent process checks 44 to see if there is any data, and if there is data, a data store is selected 46. Several data stores can then be managed in a "round robin" scheme, whereby one is filled, then the next is filled while the first is being emptied, and so forth. Each emptied data store is put back on the list of available data stores.

The selected data store is tested to see if it is already in use 48 or full 50. If it is in use, then the next data store in the list is selected 46 and tested again. A data store that is not busy and not full is written 52 with data from the pipe, and the next data is read 42 from the pipe. This process loops as long as there is data, selecting the same data store, until the data store fills up. When the data store is tested 50 as full, the intelligent process signals 54 the data manager in the backup system to retrieve and archive the data in the current data store. Since the data store is full, it will be marked 56 with a "backup pending" flag until such time as the data manager completes the storage process and resets the flag.

One system that can be adapted to carry out many of the data stores functions is the EMC Data Manager (EDM) from EMC Corporation of Hopkinton, Mass. A description of this enterprise-wide client-server backup solution can be found in U.S. patent application Ser. No. 09/052,208 filed Mar. 31, 1998, and incorporated herein by reference. In some implementations it may not be necessary to manage the set of data stores as part of the intelligent process running in the host computer, since the backup system could do this transparently, making the transfer appear more like a TCP transfer across a network. Additional EMC documentation can be found at the EMC web site or requested from the manufacturer regarding these commercially available products.

Operational connection between the data stores and the backup system can be implemented according to known methods for moving data from a disk in one system to a disk in another, via direct channel such as a Small Computer System Interface (SCSI) bus, or via a network, such as by using TCP. By directly writing to Symmetrix API Socket as known in the art, the network can be bypassed with a logical backup. This configuration would permit a customer to perform both a physical and a logical backup using the same configuration.

In any event, a direct connect backup technology would also be sufficient for the purpose of removing the data from the data stores and placing it into an archive file. The data in each data store must also be tied to a single logical backup. Control information about the data, so-called "meta-data," must also be conveyed to the backup system. In a conventional API, the vendor supplies useful cataloging information such as the application name, and version, etc. In this case, since the pipe is merely a data structure into which a preceding process pumps data, there is little meta-data available. However, the process can be configured to recognize the name of the program sending it the data, the date and time, the machine name, the socket identification, and other information. Other programs can be created that will determine who is sending the data.

Once the end of the data is read 44, i.e., the last DBMS output buffer is flushed; the named pipe signals 58 the data manager of the backup system to complete the archiving process. This may include operations such as writing the backup tapes with their appropriate catalogs. It is important for proper processing that the named pipe wait 60 for the backup system to complete its operations, as signaled by the data manager. Only then should the named pipe terminate with the proper return code to the user (i.e., complete or failed). In some cases a Unix command process may take a branch depending upon pipe process return codes when a process terminates.

To retrieve the data from an archive tape 18A, an operator executes the appropriate command to import a file, or restore a database. The input to the command is generated by a named pipe running in the reverse order from the export mode. The pipe direction could be set by an optional command switch, for example, such that the eb_dc_pipe intelligent process is producing data from the archive rather than archiving data. In effect, data is then pumped out of the archive tapes in the backup system, through the data stores, and into the import file established by the retrieve command.

Figure 4:
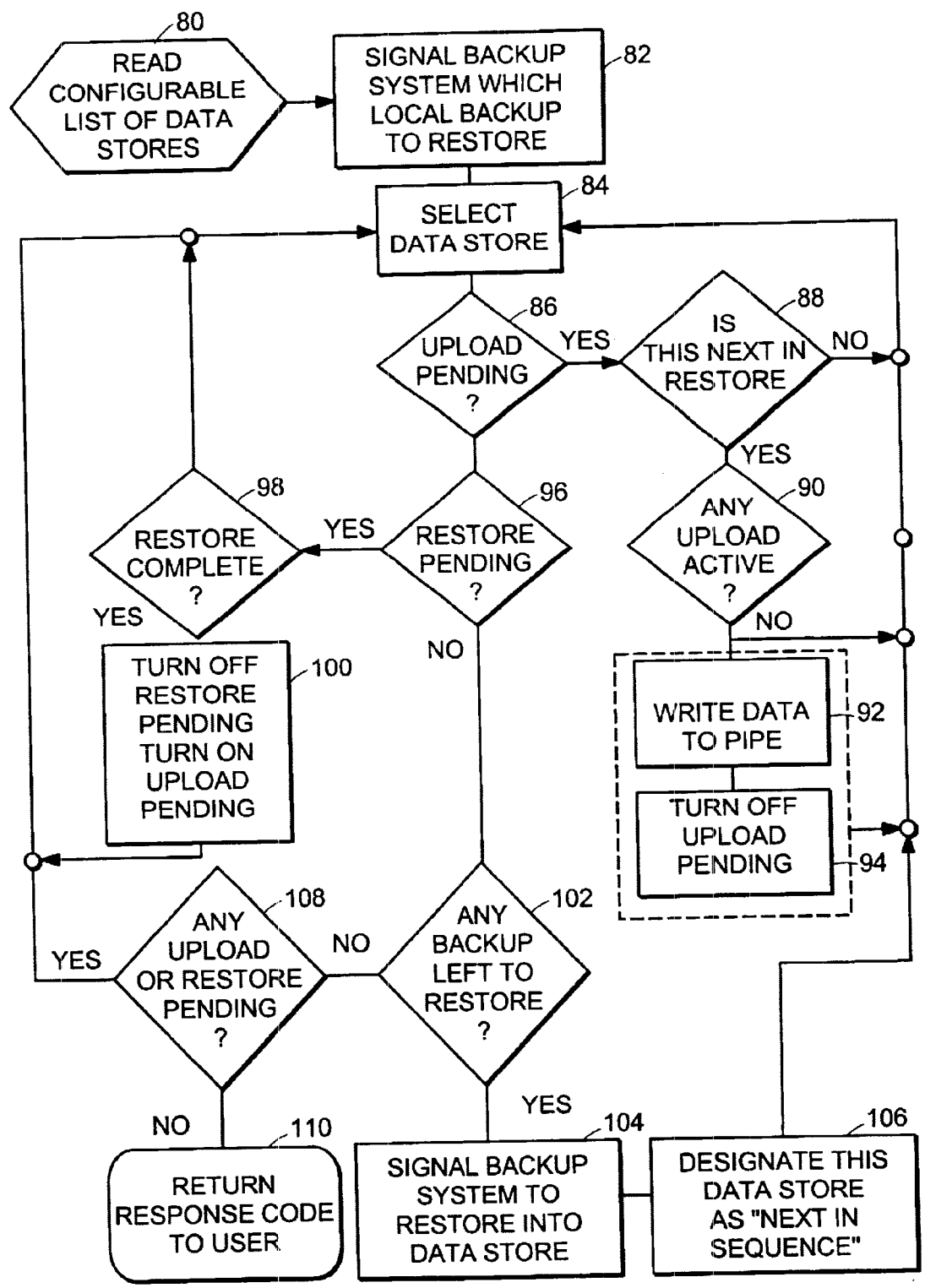
FIG. 4 is a flowchart showing the operation of an import operation according to the invention.

According to the flow chart of FIG. 4, the retrieve operation of an illustrative embodiment of the present invention proceeds as follows. The intelligent process is typically activated when the pipe is created in anticipation of a database retrieval stream. When the retrieval operation is activated, the intelligent process illustrated reads the list of data stores 80 that have been allocated for this operation.

The backup system is notified 82 which logical backup to restore from. This is typically a date and time of a specific backup instance of this configuration. The selection may be determined by browsing the backup catalogs 37 with the backup system GUI, or by direct user specification. The intelligent pipe process will request that the backup system restore the backup files into the data stores in the same sequence as they were backed up in. There is no requirement that there be the same number of data stores at restore time that were used for the backup. As each data store is filled, it will be written to the named pipe in sequence, presenting the DBMS application with a single logical stream of data.

The selected data store 84 is checked to see if it is in an upload pending state 86. This means that a backup file has been completely restored into the data store, but the data has not yet been written to the named pipe. If it is in upload pending state, it is then checked to see if it contains the next backup in logical restore sequence 88. If it is, and there are no data stores currently being written to the pipe 90, then the contents of the data store are written to the pipe 92. Subsequently, the data store is now made available for new data 94. The actual pipe writing process may go on asynchronously from the restoration of data into data stores. This will help ensure that the pipe writing process spends little time waiting for data to be available. If the data store is either not the next in logical restore sequence or there are any data stores already being written to the pipe, then another data store is selected.

Given a data store that is not in an upload pending state, it is then checked to see if it is currently being restored into 96. In this case, it cannot be touched until the backup system completes its restore 98. If, however, a check of the backup system reveals that the restore for this data store has completed 98, then the restore pending designation is removed, and the data store is marked as being ready to be written to the pipe 100.

If the data store was in neither upload pending 86 or restore pending 96 status, the backup system is checked to see if there are any more restores left to be scheduled for this logical restore 102. If more restores need to be done 102, the backup system is notified to begin restore of the next backup file into this data store 104. The data store is marked as being the next one in the sequence 106.

This process continues iteratively until there are no more restores to be done 102, and all data stores have been written in sequence to the pipe 108.

Although the present invention has been described according to an illustrative embodiment, it would be apparent to one of ordinary skill in the art that a more sophisticated implementation could make beneficial use of a cache system in which the backup system cache would match the speed of the DBMS and the network, thus minimizing the delay attributable to the backup system internals. Additional optimization may be achieved based upon additional details of a particularized implementation and configuration of the DBMS and the backup system, such as the known buffer sizes, physical disk sizes, channel speeds, type and number of physical devices, formats for meta-data, etc.

As another alternative, it should be apparent that known buffer management methods other than the described "round robin" method can be applied without changing the underlying invention. Furthermore, the data stores themselves may be implemented as pipe processes using logical rather than particular physical storage facilities.

One skilled in the art should also recognize that the described invention has numerous applications in addition to streamlining the export/import file process, since the invention provides a generalized facility for using named pipes to move large amounts of data between a host computer and a backup system.

Furthermore, although particular divisions of functions are provided among the various components identified herein, it should be appreciated that functions attributed to one device or process may be beneficially incorporated into a different or separate device or process. Similarly, the functional steps described herein may be modified with other suitable algorithms or processes that accomplish functions similar to those of the method and apparatus described without significant deviation from the invention.

Although the invention has been described and shown with respect to an illustrative embodiment thereof, it should be appreciated that the foregoing and other various changes, omissions, and additions in the form and detail thereof could be implemented without changing the underlying invention.

What is claimed is:

1. A method of directly connecting an output of a computer process to a storage device comprising the steps of:

creating a FIFO pipe fed by said output;

emptying said FIFO pipe into an intelligent process; and storing data from said intelligent process into said storage device, wherein said intelligent process includes at least one FIFO data store and each of said at least one FIFO data stores conveys said data from said FIFO Dip to said storage device:

wherein said storing data includes, reading data from said FIFO pipe, selecting one of said at least one FIFO data stores to identify a selected data store, marking said selected data store as busy, and writing said data read from said FIFO pipe into said selected data store, wherein if said selected data store is filled, and there is additional data in said FIFO pipe, then said storing includes, selecting a next one of said at least one FIFO data stores, writing said additional data in said FIFO pipe into said selected next one of said at least one FIFO data stores, and writing said data from said selected data store into said storage device, and wherein if said selected data store is filled, and there is no additional data in said FIFO pipe, then said storing includes waiting until said FIFO pipe is closed; and writing said data from said selected data store into said storage device.

2. The method of claim 1 in which said step of selecting one of said at least one FIFO data store further comprises the steps of:

reading a list of available data stores;

determining which of said available data stores is not busy; and identifying the determined available data store as being the selected data store.

3. The method of claim 2 in which said step of determining which of said data stores is not busy further comprises the steps of:

managing said list of available data stores as a round robin list in which each data store identified as busy is omitted from the round robin list, and each data store that becomes not busy is added to the end of the round robin list.

4. The method of claim 1 in which said step of storing data from said intelligent process into said storage device further comprises the steps of:

determining a sequence of said at least one data store to be filled with data;

filling said sequence of said at least one data store;

passing information regarding said sequence to said storage device; and conveying data from said sequence of said at least one data store to said storage device according to said information.

5. An apparatus for directly storing output from a computer process into a storage device comprising:

said computer process generating data to an output;

a FIFO pipe fed by said output;

an intelligent process fed by said FIFO pipe, wherein said intelligent process includes
a set of physical storage locations arranged as a set of data stores,
a selector for determining which of said data stores should be next filled,
a monitor for determining when said data store is fill, and
a selector for determining which of said full data stores should be next fed to said storage device; and said storage device for storing data from said intelligent process.

6. The apparatus of claim 5 in which said selector is adapted to use a round robin list for selecting a next available data store, and each data store is removed from said list while being filled or while being fed to said storage device.

7. A method of directly connecting a computer processing output to a data storage device comprising the steps of:

writing data from said computer processing output into a FIFO pipe;

emptying said FIFO pipe into an intelligent process;

wherein said intelligent process includes at least one FIFO data store and each of said at least one data stores conveys said data from said FIFO pipe to said storage device;

using said intelligent process to distribute said data across a sequence of data stores selected from a plurality of available data stores, wherein said using includes,
reading data output from said FIFO pipe,
detecting the end of said data, and
if said data has not ended,
selecting a current data store that is not busy;
marking said selected store as busy;
writing said data into said current data store if said current data store is not full;

emptying each of said data stores into said data storage device according to said sequence; and signaling said intelligent process when said sequence is completed.

8. The method of claim 7 in which said step of using said intelligent process further comprises the steps of:

reading a list of available data stores; wherein
if said data has ended, then
signaling a data manager to empty a final data store;
waiting for said data manager to signal completion; and
recording a response code for said FIFO pipe; and
if said data has not ended and if said current data store is full, then
signaling the data manager to empty the current data store; and
marking the current data store as busy;
repeating said selecting and testing a current data store until a data store is found to be not full and not busy and then proceeding as if not full; and if said current data store is not fill, then
repeating said steps of reading data, detecting the end, selecting, testing, and writing, until said end of data is detected.

9. A method of directly reading data from a storage device into a computer process comprising the steps of:

activating a FIFO pipe having an input from an intelligent process and an output to a destination file, wherein said intelligent process includes at least one FIFO data store and each of said at least one data stores conveys data from said storage device to said FIFO pipe;

reading said data into said intelligent process from said storage device;

selecting one of said at least one FIFO data stores to identify a selected data store, marking said selected data store as busy, and writing said data read from said storage device into said selected data store, wherein
if said selected data store is filled, and there is additional data to be read from said storage device, then said storing includes,
selecting a next one of said at least one FIFO data stores,
writing said additional data from said storage device into said selected next one of said at least one FIFO data stores, and
writing said data from said selected data store into said FIFO pipe, and wherein
if said selected data store is filled, and there is no additional data to be read from said storage device, then said storing includes
waiting until said data is read from said storage device, and writing said data from said selected data store into said FIFO pipe.

10. The method of claim 9 in which said step of reading said data further comprises the steps of:

identifying one of said at least one FIFO data stores to be filled;

filling said identified data store with said data;

signaling said intelligent process to identify a next FIFO data store; and repeating the steps of filling, signaling, and identifying until said data from said storage device is exhausted; and signaling said intelligent process that said data is exhausted.

11. The method of claim 9 in which said step of writing said data into said FIFO pipe further comprises the steps of:
- obtaining a sequence of said at least on FIFO data stores containing data;
- emptying said data into said FIFO pipe, and
- repeating said steps of obtaining and emptying until a signal is received.

12. The method of claim 9 in which said at least one FIFO data store further comprises a plurality of data stores managed as a round robin list, whereby each one of said plurality of data stores is either identified for filling, waiting to be emptied, or available, as determined by said intelligent process.

13. A method for communicating between a computer and a storage device comprising the steps of:
- piping the output of a first computer process into an intelligent process;
- storing the output of said intelligent process into a first file in said storage device;
- reading data from a second file in a storage device into an intelligent process; and
- piping said data into the input of a second computer process;
- wherein said intelligent process includes a set of FIFO data stores for conveying said output to said first file and for conveying said data to said second computer process and wherein said intelligent process is fed by a FIFO pipe and further includes,
  - a set of physical storage locations arranged as a set of data stores,
  - a selector for determining which of said data stores should be next filled,
  - a monitor for determining when said data store is full, and
  - a selector for determining which of said full data stores should be next fed to said storage device.

14. The method of claim 13 in which said step of storing further comprises the steps of:
- selecting one of said set of FIFO data stores and filling it with said output,
- signaling said storage device to empty said output; and
- repeating said steps of selecting and signaling until said first computer process is complete.

15. The method of claim 13 in which said step of reading data further comprises the steps of:
- selecting one of said set of FIFO data stores and filling it with said data;
- signaling said intelligent process to empty said data; and
- repeating said steps of selecting and signaling until said data file is exhausted.

16. The method of claim 13 in which said intelligent process further includes:
- a list of FIFO data stores and a status indicator for each said FIFO data store on said list;
- a sequencer for selecting and filling a FIFO data store according to said status indicator; and
- a sequencer for selecting and emptying a FIFO data store according to said status indicator.

17. The method of claim 13 in which said intelligent process further includes:
- a means for associating said output with said first file; and
- a means for associating said data with said second computer process.

* * * * *